United States Patent Office 3,158,397
Patented Nov. 24, 1964

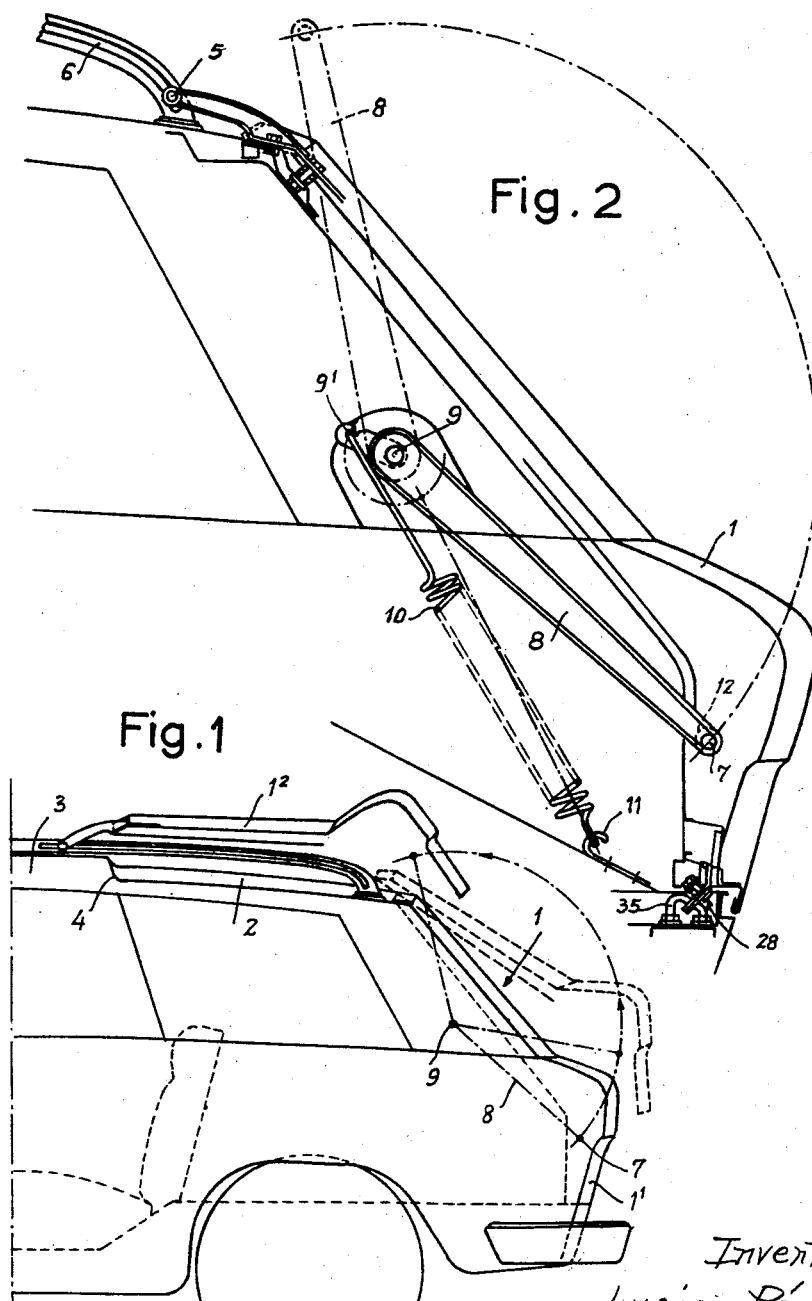

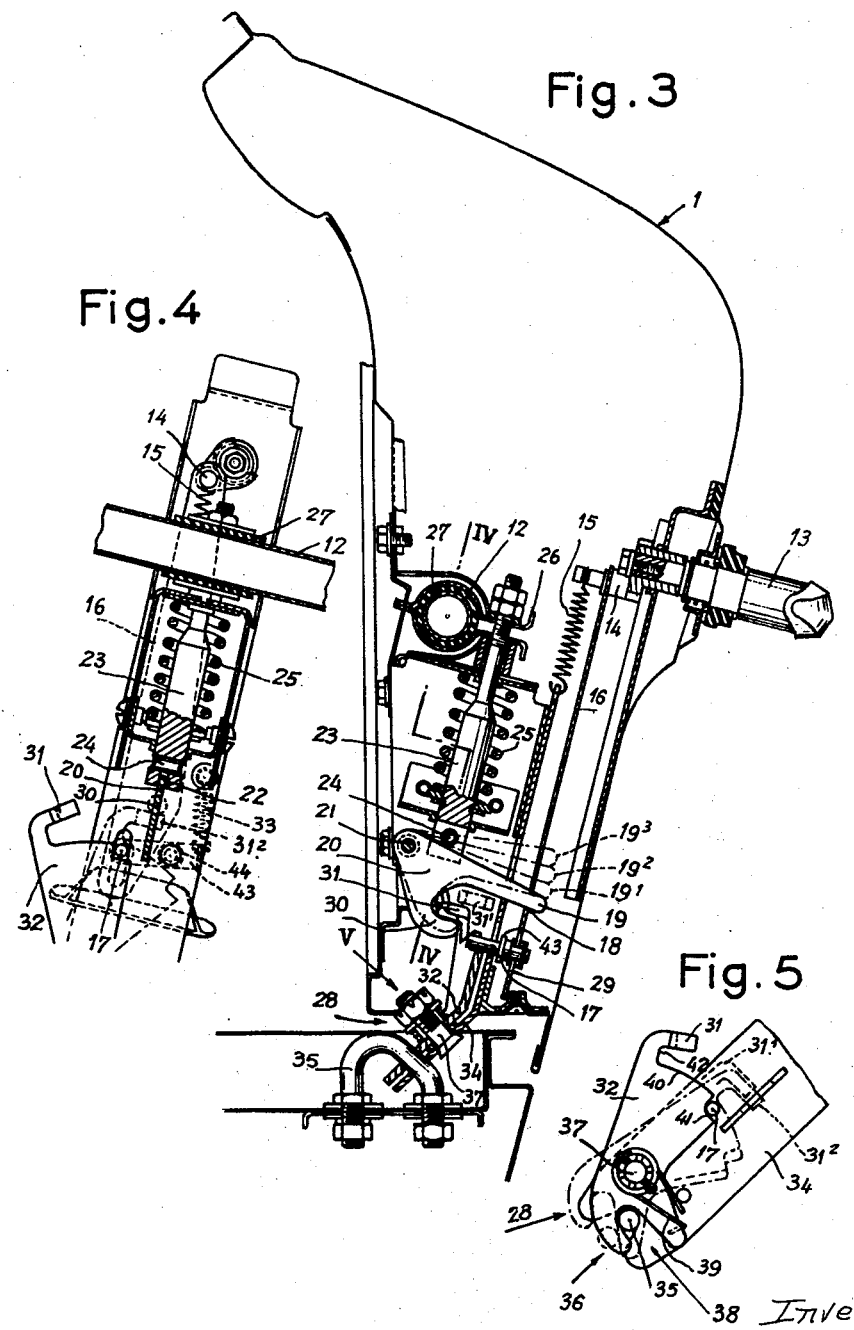

3,158,397
REAR DOORS AND LIDS OF AUTOMOBILE VEHICLES
Lucien Péras, Billancourt, France, assignor to Regie Nationale des Usines Renault, Billancourt, France
Filed Mar. 21, 1963, Ser. No. 266,995
Claims priority, application France, Mar. 28, 1962, 892,542, Patent 1,327,780
4 Claims. (Cl. 296—106)

This invention relates in general to devices for pivotally and hingedly mounting and controlling the opening members or like component elements of the body or coachwork of an automobile vehicle, and has specific reference to devices of this character for a rear door, notably of an estate car.

This invention provides various improvements in devices of this character which are characterized in that:

(1) The upper portion of the opening member is provided with a pair of rollers engaging a pair of corresponding lateral guideways placed at roof level.

(2) The lower portion of the opening member is connected to the vehicle body through a pair of pivoted arms.

(3) A control member actuated by means of a handle accessible from outside permits both of locking the opening member in the closed position and to hold this member in any desired intermediate position.

In case said opening member is a rear door of a vehicle, notably in the case of an estate car, this arrangement permits of folding completely the rear door as a unit over the rear portion of the vehicle roof, this rear portion being provided as a rule with a shallow recess adapted to receive the rear door. The rear door may also be inserted between the two lateral uprights or like lateral supports of a luggage rack. It may be noted that during its opening movement and due to the specific type of hinge mounting contemplated the rear door will not protrude appreciably from the rear limits of the vehicle and that the absence of conventional hinge means makes it possible to design a rear door having a relatively elaborate but functional shape without increasing the mechanical importance of the linkage means.

In order to afford a clearer understanding of this invention a specific form of embodiment thereof concerning a rear door of an automobile vehicle, for example an estate car, will now be described with reference to the attached drawings, in which:

FIGURE 1 is a diagrammatic view showing the rear portion of a vehicle body equipped with the rear door mounting device of this invention;

FIGURE 2 is a diagrammatic vertcial section showing on a larger scale the manner in which the rear door is mounted on the vehicle, the section being taken in the axial longitudinal plane of the vehicle; and FIGURES 3, 4 and 5 are different sections showing the members provided for locking the rear door in different intermediate positions.

As shown in FIG. 1, the rear door 1 of the vehicle is shaped to correspond to the configuration of the rear part of the vehicle body. This rear door is illustrated in its closed position at 1¹ and in its fully open position at 1². In the fully open position 1² the rear door is folded completely over the rear portion 2 of the vehicle roof 3. In the example illustrated this portion 2 is at a level somewhat lower than the roof 3 and merges into the latter along a transverse shoulder 4.

The upper portion of the rear door carries a pair of rollers 5 (FIG. 2) engaging a pair of lateral guide rails 6.

The lower portion of the rear door 1 is pivoted at 7 on an arm 8 pivoted in turn at 9 on the vehicle body. A traction spring 10 having one end anchored on the hook 9¹ solid with the aforesaid arm 8 and the other end attached at 11 on the vehicle body compensates approximately the weight of the rear door.

A transverse pivot means comprising hollow cylindrical shaft 12 rigid with the ends 7 of arms 8 interconnects these two arms to permit the locking of the rear door in any desired position as well as the pivotal movements of these arms and also of the door.

The locking and opening member (see FIGS. 3, 4 and 5) consists of a control handle 13 actuating an eccentric 14 constantly urged to its door-closing position by a tension spring 15 and pivoted on one end of a link 16 having its other end provided with a slot 29 slidably engaged by a bolt or locking pin 17 (secured on one end of a lever pivoted on a pin 44 and urged by a spring 33) and with an elongated hole 18 engaged by the arm 19 of a retaining lever 20 pivoted on a pin 21. This lever 20 engages the slot 22 formed in the lower end of an unlocking means comprising a push-rod 23 carrying a transverse pin 24 and is adapted, by acting upon this pin 24, to compress a spring 25 surrounding the push-rod 23. The upper end of push-rod 23 actuates a clamping collar 26 fitted concentrically around a friction lining 27 and the aforesaid tubular shaft 12.

The locking element consists of a lock 28 adapted to engage a fixed strap 35. This lock is of a known type for example of the type shown and described in the prior U.S. Patent No. 2,795,947 filed on June 18, 1957 by the same applicant and entitled "Door closing device" and comprising (see FIG. 5) on the one hand a supporting plate 34 formed with a notch 36 adapted to receive the strap 35, and on the other hand a hook-shaped plate 32 pivoted about a pin 37 carried by the supporting plate 34. This hook-shaped plate 32 as shown in FIG. 5 is urged in the clockwise direction by a spring 39. It is provided on one side with an oblique notch 38 adapted to receive the strap holding member 35 and which is equally spaced from pin 37 as notch 36, and on the other side of this pin with an arm 31 and a cam face 40 extending between two shoulders 42, 41 for stopping the aforesaid bolt 17, as explained hereafter.

In its locking condition the hook-shaped plate 32 is in the position shown in thick lines in FIG. 5; the strap 35 is engaged by the two notches 36 and 38, plate 32 is locked by bolt 17 against shoulder 41. When bolt 17 is raised as will be explained presently the strap 35 is released with the assistance of spring 39, whereby plate 32 is caused to rotate in the clockwise direction and arm 31 moves to position 31²; with bolt 17 now bearing against shoulder 42. Thus, the lock is open. To reclose same, strap 35 is simply re-engaged by notches 36 and 38 (their apertures now registering) and the supporting plate 34 is pressed against strap 35. Due to the pressure exerted by this strap 35, the hook-shaped plate 32 is tilted immediately in the counter-clockwise direction, bolt 17 returning against shoulder 41 and holding plate 32 in the locking position as long as it is kept in this position.

The operation of the complete rear-door locking and retaining device will now be described with reference to FIGS. 3 to 5 of the drawings wherein the device is shown in its closed position.

To open the device, the user rotates the handle 13 and the eccentric 14 pulls the link 16 upwards. During this movement the arm 19 moves successively to position 19¹, 19² and 19³.

At 19¹ the lever 20 engages the pin 24.

At 19² the pin 24 is lifted by lever 20 and collar 26 is released by the action of spring 25 and thus the tubular shaft 12 is free to rotate.

At 19³ the end portion of slot 29 lifts the bolt 17, thus releasing the lock 28.

During the opening movement of supporting plate 32 the arm 31 thereof abuts against the arm 30 of lever 20 (position 31$^1$) while permitting nevertheless in this position the release of strap 35.

It is subsequently possible to raise the rear door 1 by means of the handle 13. When this handle 13 is released, the collar 26 is clamped automatically on the tubular shaft 12 by the force of spring 25 as the handle 13 is moved back to its initial position under the influence of return springs 15 and 25. During this movement lever 20 resumes its initial position 18 and the rotation of its arm 30 enables the portion 31 of hook 32 to move to position 31$^2$. In this position 31$^2$ the hook portion 31 prevents the arm 19 from moving to position 19$^3$ corresponding to the release position of the door lock (this condition prevailing until another locking operation is effected, irrespective of the handle position) for in position 19$^2$ the arm 30 abuts against the element 31 (the purpose of this safety position will be explained presently).

To close the rear door, the user rotates the handle 13 to release the clamping collar 26. Thus, the rear door, by gravity or due to the downward movement impressed thereto by the user, will be reclosed and the lock 28 will operate automatically, as explained hereinabove, the return spring 33 reintroducing the bolt 17 into the catch notch of hook 32. The purpose of the above-described safety position is explained hereafter:

If, during the closing movement with the handle 13 kept by the user in its fully rotated position, the arm 19 were not stopped in position 19$^2$ so that it could not move to position 19$^3$ corresponding to the released position of lock 28, there would be the risk of preventing this lock from becoming operative when the door is closed with the handle 13 fully rotated (bolt 17 being locked in its uppermost position so that it cannot engage the shoulder 41 of plate 32).

Although the present invention has been described in conjunction with a preferred embodiment, it is to be understood that modifications and variations may be resorted to without departing from the spirit and scope of the invention, as those skilled in the art will readily understand. Such modifications and variations are considered to be within the purview and scope of the invention and appended claims.

I claim:

1. An automobile door such as the rear door of an estate wagon, comprising, a pair of laterally spaced guideways adapted to be attached to the roof of said wagon, a door member, laterally spaced rollers attached to the upper portion of said door member and engaging respective ones of said guideways, a pair of laterally spaced arms pivotally attached at one end to a transverse pivot means and adapted to be pivotally attached at their other ends to the body of said wagon, said transverse pivot means being attached to a lower portion of said door member, a clamping device adapted to lockingly engage said pivot means so as to prevent pivoting of said spaced arms about said pivot means, a movable door handle extending exteriorly of said door member, a door holding member adapted to be attached to the body of said wagon, a locking device attached to the interior side of said door member and being lockingly engageable with said holding member, said door handle being operatively connected to said clamping device and to said locking device whereby actuation of said handle in turn actuates said clamping and locking devices between respective locking and unlocked positions.

2. The automobile door of claim 1, said locking device comprising a hook member comprising a hook-shaped portion which lockingly engages said holding member, said hook member being pivotable between locking and unlocked positions relative to said holding member, a locking pin engageable with said hook member so as to lock said hook member in its locking position, said pin being movable out of locking engagement with said hook member, said clamping device comprising a spring-loaded friction means for frictionally locking said pivot means, and means for unlocking the locking engagement between said friction means and said pivot means, a link member attached to said door handle so as to be movable by rotation of said handle between locking and unlocking positions, said link member comprising an elongated slot engaging said locking pin and permitting relative movement between said link and pin between the ends of said slot, said link member being attached to said unlocking means with substantially no slack movement therebetween, said pin being at one end of said slot with said hook member in its locking position, whereupon rotation of said door handle will move said link member and thereby unlock said friction means while said link member moves freely of said pin until said pin is at the opposite end of said slot, further rotation of said handle causing said link member to move said pin out of locking engagement with said hook member.

3. The door of claim 2, said clamping device unlocking means comprising a pivoted lever attached to said link member, said lever being connected to said spring loaded friction means and being pivotable between respective locking and unlocking positions to cause said friction means to either lock or release said transverse pivot means, said hook member comprising first and second shoulder portions each engageable with said locking pin, said first shoulder portion being engageable with said pin when said hook member is in its locked position and said second shoulder portion when said hook member is in its unlocked position, means for limiting the movement of said link member in the unlocking direction thereof, said movement limiting means becoming effective only after said link member has completed a full unlocking movement and has returned to its locking position, said link member being then limited by said movement limiting means to be movable by said handle in the locking direction only to an extent which does not exceed the length of said slot.

4. The door of claim 3, said movement limiting means comprising a protruding lip on said hook member engageable with a corresponding lip on said lever, said lip on said hook member abutting said lever and thereby being held out of engagement with said lever lip while said lever is in its unlocking position, said lips engaging one another after said lever has returned to its locking position thereby limiting the movement of said link member through limiting the movement of said lever.

References Cited in the file of this patent

UNITED STATES PATENTS

| | | |
|---|---|---|
| 688,082 | Geary | Dec. 3, 1901 |
| 747,888 | Lawrence | Dec. 22, 1903 |
| 2,213,230 | St. John | Sept. 3, 1940 |
| 2,745,147 | Berry | May 15, 1956 |
| 2,857,638 | Ribeiro | Oct. 28, 1958 |